US010061314B2

(12) United States Patent
Miller

(10) Patent No.: US 10,061,314 B2
(45) Date of Patent: Aug. 28, 2018

(54) ENHANCED VEHICLE OPERATION

(71) Applicant: Ford Global Technologies, LLC, Dearborn, MI (US)

(72) Inventor: Robert Miller, Plymouth, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 31 days.

(21) Appl. No.: 15/236,771

(22) Filed: Aug. 15, 2016

(65) Prior Publication Data

US 2018/0046186 A1 Feb. 15, 2018

(51) Int. Cl.
| | |
|---|---|
| *G05D 1/00* | (2006.01) |
| *B60W 10/22* | (2006.01) |
| *B60W 10/06* | (2006.01) |
| *B60W 10/20* | (2006.01) |
| *G05D 1/02* | (2006.01) |
| *B60W 30/18* | (2012.01) |

(52) U.S. Cl.
CPC ........... *G05D 1/0088* (2013.01); *B60W 10/06* (2013.01); *B60W 10/20* (2013.01); *B60W 10/22* (2013.01); *B60W 30/18* (2013.01); *G05D 1/0221* (2013.01); *B60W 2540/30* (2013.01); *B60W 2710/0622* (2013.01); *B60W 2710/20* (2013.01); *B60W 2710/223* (2013.01); *B60W 2720/24* (2013.01); *G05D 2201/0212* (2013.01)

(58) Field of Classification Search
CPC ............... G05D 1/0088; G05D 1/0221; G05D 2201/0212; B60W 10/06; B60W 10/20; B60W 10/22; B60W 30/18; B60W 2540/30; B60W 2710/0622; B60W 2710/20; B60W 2710/223; B60W 2720/24

USPC .......................................................... 701/25
See application file for complete search history.

(56) References Cited

U.S. PATENT DOCUMENTS

| 9,090,259 B2 * | 7/2015 | Dolgov ............... B60W 30/095 |
| 9,110,774 B1 | 8/2015 | Bonn et al. |

(Continued)

FOREIGN PATENT DOCUMENTS

| EP | 2062797 A2 | 5/2009 |
| GB | 2544632 A1 | 5/2017 |
| WO | WO 2016012901 A1 | 1/2016 |

OTHER PUBLICATIONS

Scherer, Svenja, et al., "How the driver wants to be driven—Modelling driving styles in highly automated driving," Interdisciplinary Center for Driver Assistant Systems, Nov. 25, 2015.

(Continued)

*Primary Examiner* — Atul Trivedi
(74) *Attorney, Agent, or Firm* — Frank A. MacKenzie; Beijin Bieneman PLC

(57) ABSTRACT

A plurality of segments of a predetermined route are identified based on a plurality of transition points. A setting of at least one of a plurality of vehicle subsystems is adjusted according to an assigned operating mode when a vehicle enters one of the segments. The vehicle subsystems are actuated according to the assigned operating mode. The assigned operating mode is one of a plurality of operating modes. Each operating mode includes at least one predetermined setting for each one of the vehicle subsystems. The predetermined settings are defined according to data collected from operation of the vehicle in the route by a user.

20 Claims, 3 Drawing Sheets

(56) References Cited

U.S. PATENT DOCUMENTS

| | | |
|---|---|---|
| 9,147,296 B2 | 9/2015 | Ricci |
| 9,304,515 B2 | 4/2016 | Cudak et al. |
| 2009/0118936 A1* | 5/2009 | Heap ................. B60K 6/26 |
| | | 701/54 |
| 2010/0076640 A1* | 3/2010 | Maekawa ........... G05D 1/0217 |
| | | 701/26 |
| 2010/0082195 A1* | 4/2010 | Lee .................... B62D 15/025 |
| | | 701/25 |
| 2010/0317487 A1* | 12/2010 | Cullen ................ B60W 10/06 |
| | | 477/107 |
| 2011/0251748 A1* | 10/2011 | Moran ................. B60T 8/1755 |
| | | 701/31.4 |
| 2013/0211656 A1 | 8/2013 | An et al. |
| 2013/0218396 A1* | 8/2013 | Moshchuk ........... B60W 50/08 |
| | | 701/25 |
| 2013/0304322 A1* | 11/2013 | Isaji .................... B62D 15/025 |
| | | 701/41 |
| 2013/0325208 A1* | 12/2013 | Osagawa ............. E02F 9/205 |
| | | 701/2 |
| 2014/0195213 A1 | 7/2014 | Kozloski et al. |
| 2014/0309833 A1 | 10/2014 | Ferguson et al. |
| 2014/0365029 A1* | 12/2014 | Sugimoto ............ B60W 40/09 |
| | | 701/1 |
| 2015/0158486 A1 | 6/2015 | Healey et al. |
| 2015/0166076 A1 | 6/2015 | Kim et al. |
| 2015/0210266 A1* | 7/2015 | Yang .................... B60K 6/387 |
| | | 701/22 |
| 2015/0284010 A1 | 10/2015 | Beardsley et al. |
| 2016/0046290 A1* | 2/2016 | Aharony ............. G06K 9/00798 |
| | | 701/41 |
| 2016/0313737 A1* | 10/2016 | Berkemeier ......... G05D 1/0212 |

OTHER PUBLICATIONS

Search Report dated Dec. 22, 2017 from UK Intellectual Property Office regarding GB Application No. 1712797.8 (5 pages).

* cited by examiner

ENHANCED VEHICLE OPERATION

BACKGROUND

Users of vehicles typically operate their vehicles in a manner specific to each user. For example, a user may have a particular manners of accelerating, braking, turning, etc., as the user drive a vehicle on a roadway. Autonomous vehicles, on the other hand, operate according to general instructions that take into account things like environmental conditions, road conditions and topography, etc. Thus, autonomous vehicles, in which a vehicle controller (i.e., one or more computing devices) controls some or all of vehicle braking, steering, and propulsion, may not be suited to providing a driving experience that reflects a driving manner of a particular user.

DETAILED DESCRIPTION

A system operates a vehicle according to one of a plurality of operating modes, the operating modes including settings for one or more vehicle subsystems. Settings for each of the operating modes may be defined by recording a first user's operation of the vehicle around a test track. A second user may provide input to identify a plurality of transition points on the test track, defining a plurality of segments. The second user may assign one of the operating modes to each segment. A virtual operator may then autonomously operate the vehicle around the test track according to the assigned operating modes. At the transition points, the virtual operator adjusts the settings of the vehicle subsystems from the assigned operating mode of the previous segment to the assigned operating mode of the upcoming segment. Thus, the second user may experience the vehicle operating around the test track according to the settings of the first user. An "operating mode" for a vehicle, as that term is used herein, means a plurality of predetermined settings for a plurality of vehicle subsystems based on operation of the vehicle by the first user. Examples of operating modes are provided below. To obtain the settings, the first user drives around the test track, and a vehicle computer records the settings for the vehicle subsystems and stores the settings as the operating mode for the first user. The second user may then instruct the virtual operator to operate the vehicle according to the operating mode of the first user for at least one segment of the test track.

Figure 1:
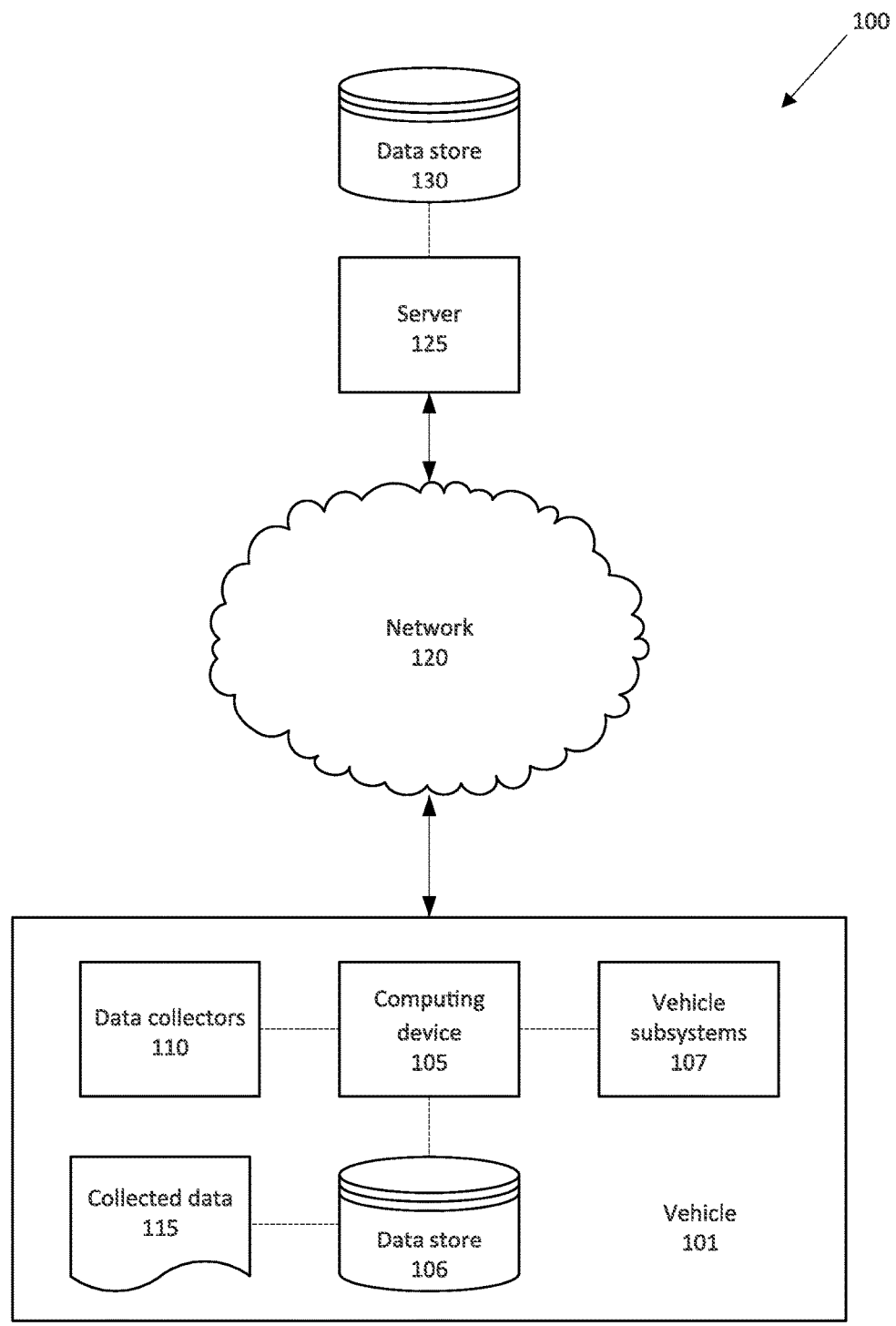
FIG. 1 is a block diagram of an example system for operating a vehicle.

FIG. 1 illustrates a system 100 for operating a vehicle 101. A computing device 105 in the vehicle 101 is programmed to receive collected data 115 from one or more data collectors 110, e.g., vehicle 101 sensors. For example, vehicle 101 data 115 may include a location of the vehicle 101, a location of a target, etc. Location data may be in a known form, e.g., geo coordinates (latitude and longitude coordinates) obtained via a navigation system, as is known, that uses the Global Position System (GPS). Further examples of data 115 can include measurements of vehicle 101 systems and components, e.g., a vehicle 101 velocity, a vehicle 101 trajectory, etc.

The computing device 105 is generally programmed for communications on a vehicle 101 network or communications bus, as is known. Via the network, bus, and/or other wired or wireless mechanisms (e.g., a wired or wireless local area network in the vehicle 101), the computing device 105 may transmit messages to various devices in a vehicle 101 and/or receive messages from the various devices, e.g., controllers, actuators, sensors, etc., including data collectors 110. Alternatively or additionally, in cases where the computing device 105 actually comprises multiple devices, the vehicle network or bus may be used for communications between devices represented as the computing device 105 in this disclosure. In addition, the computing device 105 may be programmed for communicating with the network 120, which, as described below, may include various wired and/or wireless networking technologies, e.g., cellular, Bluetooth, wired and/or wireless packet networks, etc.

The data store 106 may be of any known type, e.g., hard disk drives, solid state drives, servers, or any volatile or non-volatile media. The data store 106 may store the collected data 115 sent from the data collectors 110.

The vehicle 101 may include a plurality of subsystems 107. The subsystems 107 control vehicle 101 components, e.g., a vehicle seat, mirror, tiltable and/or telescoping steering wheel, etc. The subsystems 107 include, e.g., a steering subsystem, a propulsion subsystem, a suspension subsystem a brake subsystem, a human-machine interface (HMI), etc. The computing device 105 may actuate the subsystems 107 to control re vehicle 101 components, e.g., to stop the vehicle 101, to turn the vehicle 101, etc. For example, the suspension subsystem 107 can include a stiffness setting that defines the stiffness of the suspension subsystem 107 that the computing device 105 selectively adjusts based on the operating mode.

The computing device 105 may be programmed to operate some or all of the subsystems 107 with limited or no input from a user, i.e., autonomously. Such programming may be referred to as the "virtual operator." The virtual operator includes programming to monitor and/or control one or more subsystems 107, e.g., to provide instructions, e.g., via a vehicle 101 communications bus and/or to electronic control units (ECUs) as are known, to actuate vehicle components, e.g., to apply brakes, change a steering wheel angle, etc. When the computing device 105 operates a subsystem 107 autonomously, this means that the computing device 105 ignores at least some input from the user with respect to the subsystem(s) 107 selected for control by the virtual operator. For example, if the user attempts to press a gas pedal during virtual operator propulsion operation, the computing device 105 may ignore the human-entered command to increase throttle and accelerate the vehicle 101 according to its programming. The virtual operator autonomously operates the vehicle subsystems 107 according to one of the operating modes, as described below. Thus, a user can experience operation of the vehicle 101 by the virtual operator in a manner similar to a previous user that defined the operating mode.

Data collectors 110 may include a variety of devices. For example, various controllers in a vehicle may operate as data collectors 110 to provide data 115 via the vehicle 101 network or bus, e.g., data 115 relating to vehicle speed, acceleration, position, system and/or component status, etc. Further, other data collectors 110 could include known sensors or the like such as cameras, motion detectors, LIDAR, RADAR, ultrasonic sensors, etc., i.e., data collectors 110 to provide data 115 for evaluating the position of the vehicle 101 on a route 140, the curvature of the upcoming road, etc.

Collected data 115 may include a variety of data collected in a vehicle 101. Examples of collected data 115 are provided above, and moreover, data 115 are generally collected using one or more data collectors 110, and may additionally include data calculated therefrom in the computing device 105, and/or at the server 125. In general, collected data 115 may include any data that may be gathered by the data collectors 110 and/or computed from such data.

The system 100 may further include a network 120 connected to a server 125 and a data store 130. The computer 105 may further be programmed to communicate with one or more remote sites such as the server 125, via a network 120, such remote site possibly including a data store 130. The network 120 represents one or more mechanisms by which a vehicle computer 105 may communicate with a remote server 125. Accordingly, the network 120 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, IEEE 802.11, etc.), local area networks (LAN) and/or wide area networks (WAN), including the Internet, providing data communication services.

The computing device 105 may store user-specific settings for each subsystem 107. That is, each user of the vehicle 101 may adjust the subsystems 107 to specific settings and save the settings in an operating mode, as shown in Table 3 below. For example, the settings may include a stiffness of the suspension subsystem 107, a tension of a steering subsystem 107, an air/fuel ratio for a propulsion subsystem 107, etc. The user may determine the settings for the operating mode, and/or the computing device 105 may determine the settings for the operating mode based on a drive history of the user. That is, the user may operate the vehicle 101 for a predetermined period of time and/or over a predetermined route 140, as described below, and the computing device 105 may determine the settings for the operating mode based at least in part the operation of the vehicle 101 over the period of time and/or the route 140. That is, the computing device 105 records the settings for the vehicle subsystems 107 as the user operates the vehicle 101 around the test track. The computing device 105 may record the settings at predetermined distance and/or time intervals, e.g., every 5 meters and/or 100 milliseconds, to generate a list of settings for the vehicle subsystems 107 at a plurality of locations on the test track. The settings define the operating mode for the user. The computing device 105 records settings of vehicle subsystems 107 for a plurality of users, generating a plurality of operating modes. A subsequent user can instruct the computing device 105 to operate the vehicle subsystems 107 according to one of the operating modes. The operating modes may be stored in the server 125 and sent to the vehicle computer 105.

The virtual operator actuates the vehicle subsystems 107 according to the settings of the specified operating mode. Thus, the virtual operator autonomously operates the vehicle 101 in a manner similar to the user that defined the operating mode. A subsequent user can then experience operating the vehicle 101 on the test track in a manner similar to the user that defined the operating mode. Furthermore, the subsequent user can select different operating modes for different portions of the test track, as described below, and the virtual operator can apply the settings of the operating modes to the vehicle subsystems 107 and operate the vehicle 101 according to the different operating modes. Thus, the subsequent user can experience operation of the vehicle 101 around the test track based on the operating styles of the users that defined the operating modes.

Figure 2:
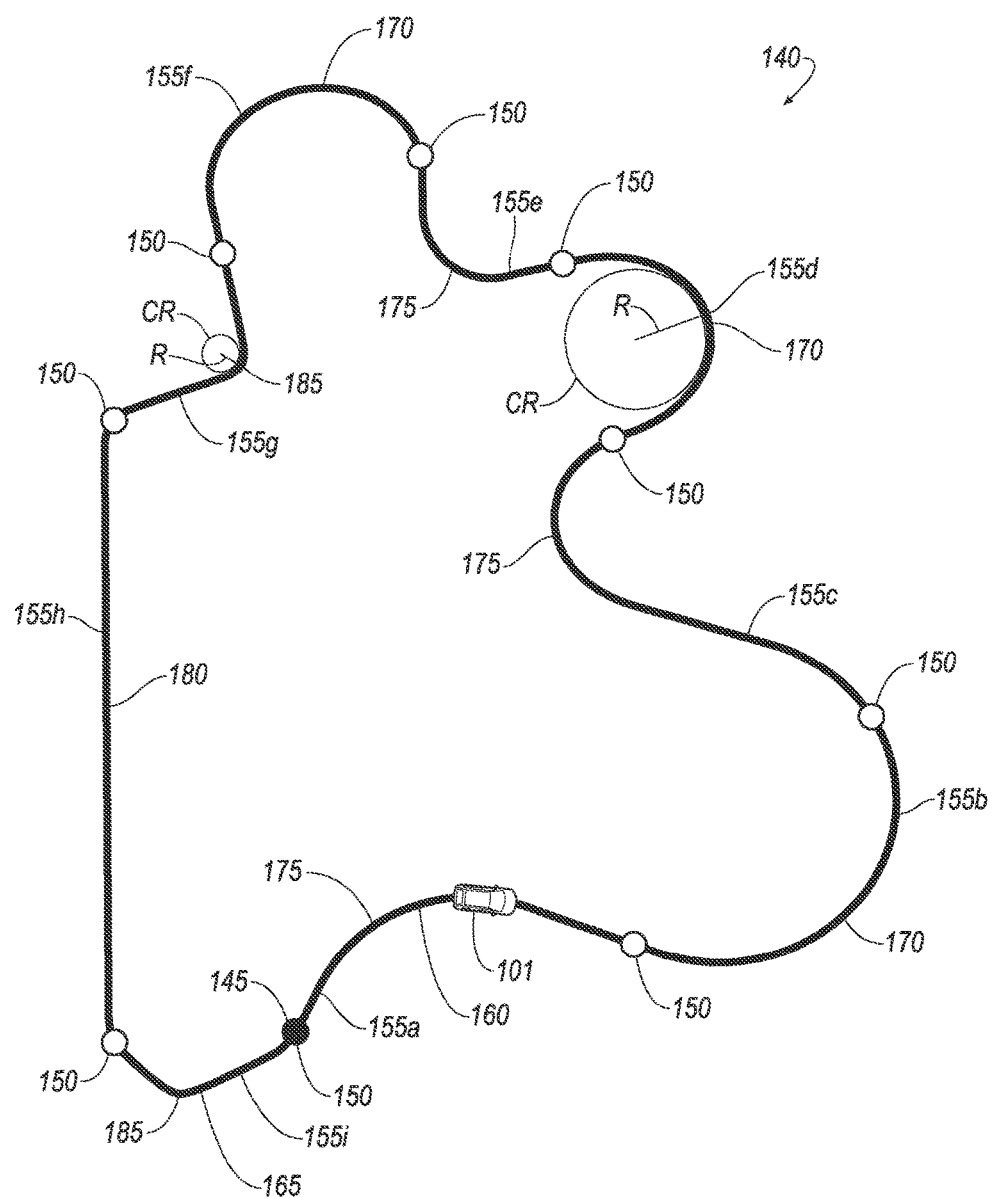
FIG. 2 illustrates an example route to operate a vehicle in one or more operating modes.

FIG. 2 illustrates an example route 140 on which the vehicle 101 travels. The route 140 is a road on which the vehicle 101 can travel, e.g., a test track in a racing facility. The route 140 may be a closed path, i.e., the vehicle 101 may continuously travel along the route 140 without leaving the route 140. Because the route 140 is a closed path, the vehicle 101 may travel a "lap," defined herein as travelling from a start point 145 around the route 140 and returning to the start point 145. The vehicle 101 may travel a plurality of laps, i.e., may travel around the route 140 a plurality of times. That is, the vehicle 101 may travel a first lap that is a first time moving from the start point 145 and returning to the start point 145 around the route 140. The vehicle 101 may then travel a second lap that is a second time moving from the start point 145 around the route 140 and returning to the start point 145. As described below, the vehicle 101 may operate in a different operating mode in the second lap than the vehicle 101 operated in the first lap. The start point 145 may be one of the transition points 150 described below, or a location on the route 140 between two transition points 150.

The route 140 includes a plurality of transition points 150. The transition points 150 are specific locations along the route 140 identified by the user. The transition points 150 may be specified by location data 115, e.g., geo-coordinates, coordinates on a predetermined map of the route 140, a distance on the route 140 from the start point 145, etc. The computing device 105 is typically programmed to change an operating mode at each transition point 150. That is, the user may instruct the computing device 105 to operate the subsystems 107 according to a first operating mode and to adjust the settings of the subsystems 107 to a second operating mode at the transition point 150. That is, at each transition point 150, the computing device 105 may transition to a new operating mode governing operation of one or more vehicle 101 subsystems 107. The user may designate one of the transition points 150 as the start point 145. The computing device 105 determines that the vehicle 101 has reached one of the transition points 150 by comparing the location data 115 of the vehicle 101 to the location data 115 defining the transition point 150. The computing device 105 may determine that the vehicle 101 has reached the transition point 150 when the vehicle 101 location data 115 is within a predetermined distance from the transition point 150, e.g., 3 meters.

The user may select the transition points 150 with a vehicle HMI 107 that receives user and provides the user input to the computing device 105, e.g., in a known manner. That is, the HMI 107 may display the route 140 without any transition points 150, and the user may provide input to specify the transition points 150 with the HMI 107, e.g., by touching points on the route 140 display. Alternatively or in addition, the computing device 105 may display transition points 150 that were selected by a previous user, e.g., a user or users whose driving defined one of the operating modes.

The computing device 105 is programmed to identify a plurality of segments 155 based on the transition points 150. Each segment 155 is defined as the portion of the route 140 between two transition points 150. Thus, the vehicle 101 operates according to one operating mode in the segment 155, being the operating mode determined by the transition point 150 at the start of the segment 155. Upon reaching the end of the segment 155, i.e., the other transition point 150, the computing device 105 adjusts the settings of the subsystems 107 according to the next operating mode and the vehicle 101 enters a new segment 155. FIG. 2 illustrates 9 segments 155, labeled 155a, 155b, 155c, 155d, 155e, 155f, 155g, 155h, and 155i, respectively. When the start point 145 is one of the transition points 150, the segment 155 that begins at the transition point 150 defining the start point 145 may be a first segment 160 of the route 140. In the example of FIG. 2, the first segment 160 is the segment 155a. The segment 155 immediately preceding the first segment 160 may be a last segment 165, i.e., the segment 155 where the transition point 150 defining the start point 145 is at an end of the segment 155. In the example of FIG. 2, the last segment 165 is 155i. The route 140 may have a different number of segments 155, and because the route 140 is a closed path, the start point 145 defines the first segment 160 and the last segment 165.

The segments 155 may each include a portion defining a radius of curvature R, the portion defined herein as a "turn." Each of the segments 155a-155i in the example of FIG. 2 includes one turn, however, in general a segment 155 may include portions defining more than one turn. The turns may include, e.g., a left turn 170, a right turn 175, a straightaway 180, i.e., substantial absence of curvature, and a sharp turn 185, i.e., having a radius of curvature below a predetermined threshold. Each segment 155 may include at least one turn having a radius of curvature R, as shown in FIG. 2. The radius of curvature R is defined as a radius of a circle CR that can be drawn on the segment 155. For example, as is known, a first radius of curvature $R_1$ that is larger than a second radius of curvature $R_2$ defines a curve that requires less steering, i.e., less change of steering angle, from the steering subsystem 107 to follow the curve. The computing device 105 may store predetermined radii of curvature R for portions of the route 140 and may identify at least one turn 170, 175, 180, 185 in each of the segments 155.

The computing device 105 is programmed to identify one or more turns 170, 175, 180, 185 for each segment 155, allowing the user to determine the operating mode based on the turn(s) 170, 175, 180, 185 present in the segment 155. That is, the user may operate the vehicle 101 around the route 140, e.g., around a race track or the like, for a plurality of laps, selecting one of the operating modes for each segment 155 in at least one of the plurality of laps. Upon experiencing the route 140 in each of the operating modes, the user may prefer certain ones of the operating modes for certain turns 170, 175, 180, 185. Thus, based on the turn 170, 175, 180, 185 identified by the computing device 105 in the segment 155, the user may select one of the operating modes for the segment 155.

If the computing device 105 identifies more than one turn 170, 175, 180, 185 in the segment 155, the computing device 105 may select one of the turns 170, 175, 180, 185, and indicate the selected turn 170, 175, 180, 185 to the user for the segment 155. For example, the computing device 105 may indicate that the selected segment 155 includes a sharp turn 185 when the segment 155 also includes a straightaway 180. Furthermore, if one of the transition points 150 is disposed in one of the turns 170, 175, 180, 185 (i.e., at or within a predetermined distance of a turn 170, 175, 180, 185 midpoint), the computing device 105 may identify that the turn 170, 175, 180, 185 belongs to more than one segment 155. Thus, the user may assign operating modes to each of the segments 155 to which the turn 170, 175, 180, 185 belongs based on the user's preferred operating mode for the turn 170, 175, 180, 185.

The computing device 105 may include a predetermined curvature threshold $R_t$, where turns with a radius of curvature above the curvature threshold $R_t$ are "smooth" turns, e.g., the left turn 170 and the right turn 175, and turns with a radius of curvature below the curvature threshold $R_t$ are "sharp" turns, e.g., the sharp turn 185. The curvature threshold $R_t$ may be determined based at least in part on the steering subsystem 107, e.g., based on how the steering subsystem 107 can steer the vehicle 101 at a given speed.

Furthermore, a segment 155 is substantially straight when the radius of curvature R is infinite and/or above a predetermined straightness threshold $R_s$, e.g., the straightaway 180. That is, when the radius of curvature R exceeds the straightness threshold $R_s$, the vehicle 101 does not move substantially to the left or to the right between the transition points 150 defining the segment 155.

The left turn 170, as shown in FIG. 2, is defined as a turn where the segment 155 defines a radius of curvature R between the transition points 150 that is above the predetermined curvature threshold $R_t$ and below the straightness threshold $R_s$ and moves the vehicle 101 to the left relative to the beginning transition point 150. The user may select one of the operating modes to operate the vehicle 101 in the segments 155 containing the left turns 170, e.g., the operating mode that completed the segments 155 with the left turns 170 in the shortest time.

The right turn 175, as shown in FIG. 2, is defined as a (urn where the segment 155 defines a radius of curvature R that is above the predetermined curvature threshold $R_1$ and below the straightness threshold $R_s$ and moves the vehicle 101 to the right relative to the beginning transition point 150. The user may select one of the operating modes to operate the vehicle 101 in the segments 155 containing the right turns 175.

The straightaway 180, as shown in FIG. 2, is defined as a segment 155 or a portion of the segment 155 where the radius of curvature R exceeds the straightness threshold $R_s$, i.e., the segment 155 is substantially straight. The straightness threshold Rs may be determined as the radius of curvature R that allows the vehicle 101 to move along the segment 155 without substantially adjusting the steering subsystem 107, i.e., the vehicle 101 will remain in the segment 155 without the steering angle deviating from substantially zero.

The sharp turn 185, as shown in FIG. 2, is defined as a segment 155 or a portion of a segment 155 where the radius of curvature is below the curvature threshold $R_t$. The curvature threshold. $R_t$ may be determined according to the smallest radius of curvature R that allows the vehicle 101 to remain in the segment 155 without applying the brake subsystem 107, i.e., without braking the vehicle 101. That is, the sharp turn 185 may be defined as a segment 155 where the computing device 105 applies the brake subsystem 107 in addition to the steering subsystem 107 to travel the segment 155. The segments 155 that include a sharp turn 185 may thus require actuation of subsystems 107 in addition to subsystems 107 actuated for segments 155 containing left turns 170, right turns 175, and the straightaways 180.

Table 1 illustrates example operating modes for the vehicle 101. The operating modes define settings for vehicle subsystems 107 that the computing device 105 applies and operates the subsystems 107. The virtual operator applies the settings to the subsystems 107 and operates the vehicle 101 around the route 140. That is, when the virtual operator operates the vehicle 101 in a specified operating mode, the operation of the vehicle 101 by the virtual operator mimics the operation of the vehicle 101 by the user who defined the operating mode. Thus, a subsequent user can experience operation of the vehicle 101 in a similar manner to the user that defined the operating mode. As described above, the operating modes may be defined by operation of the vehicle 101 by other users.

TABLE 1

| Mode | Left Turn | Right Turn | Straightaway | Sharp Turn |
|---|---|---|---|---|
| Mode A | 0:25 | 0:39 | 1:04 | 0:35 |
| Mode B | 0:29 | 0:37 | 1:09 | 0:34 |
| Mode C | 0:31 | 0:45 | 0:58 | 0:32 |
| Mode D | 0:33 | 0:43 | 1:01 | 0:22 |
| Best Time | Mode A | Mode B | Mode C | Mode D |

Table 1 shows four example operating modes defined by four users, e.g., skilled or famous vehicle 101 users, listed as Modes A, B, C, D. The users that define the Modes A, B, C, D may travel a plurality of laps around the route 140, and the computing device 105 may record data 115 regarding the vehicle subsystems 107, e.g., settings of the vehicle subsystems 107 as shown in Tables 3A-3B below.

Furthermore, as shown in Table 1, the computing device 105 may record a time elapsed in each segment 155 during each route 140. The computing device 105 may determine an average time that the vehicle 101 spent in each of the segments 155 of the route and/or in each of the segments 155 that correspond to one of the four turns 170, 175, 180, 185. That is, in Table 1, the column labeled "Left Turn" indicates an average time for the vehicle 101 to complete segments 155 that include a left turn 170 with settings for each of the Modes A, B, C, D. Accordingly, the column labeled "Right Turn" indicates an average time for the vehicle 101 to complete segments 155 that include a right turn 175, the column labeled "Straightaway" indicates an average time for the vehicle 101 to complete segments 155 that include a straightaway 180, and the column labeled "Sharp Turn" indicates an average time for the vehicle 101 to complete segments 155 that include a sharp turn 185.

The row labeled "Best Time" indicates the operating mode that has the lowest average time for segments 155 with the specified turn 170, 175, 180, 185. For the left turn 170, the lowest time is 0:25 for Mode A. For the right turn 175, the lowest time is 0:37 for Mode B. For the straightaway 180, the lowest time is 0:58 for Mode C. For the sharp turn 185, the lowest time is 0:22 for Mode D. Alternatively, the "Best Time" may be a lowest aggregate time of the vehicle 101 over a plurality of laps.

The user may select the operating mode for each segment 155 based on the Best Time to complete the route 140 in the shortest time, or may select a different operating mode than the one listed as the Best Time. For example, the user may operate the vehicle 101 around the route 140 for a plurality of laps and select a different one of the operating modes for each segment 155 in a lap to experience each of the operating modes in every segment 155 of the route 140. The user may then decide on a preference for one of the operating modes for certain segments 155, e.g., the user may prefer the settings for the steering subsystem 107 of Mode A in one of the sharp turns 185, even though Mode D has the lowest time in the sharp turns 185, and the user may select the Mode A for one of the segments 155 including one of the sharp turns 185.

Based on the average times for each Mode A, B, C, D, the user may select an operating mode for each segment 155. Table 1 shows that Mode A has the lowest time for segments 155 containing left turns 170, so the user may select Mode A for segments 155 containing left turns 170. Furthermore, Mode B has the lowest time for segments 155 containing right turns 175, Mode C has the lowest time for segments 155 containing straightaways 180, and Mode D has the lowest time for segments 155 containing sharp turns 185. The computing device 105 may suggest to the user the operating mode listed in the "Best Time" row for segments 155 containing the specified turn 170, 175, 180, 185. For example, if the segment 155 includes a sharp turn 185, the computing device 105 may display a notification on the HMI 107 that the Mode D had the lowest time of the Modes A, B, C, D. Furthermore, if the computing device 105 determines that the user has not selected an operating mode for one of the segments 155, the computing device 105 may be programmed to select one of the operating modes for the segment 155 lacking an operating mode according to a predetermined operating mode characteristic, such as time to traverse a segment, e.g., the computing device 105 may be programmed to select the operating mode listed as the Best Time based on the turn 170, 175, 180, 185 in the segment 155.

Table 2 shows example operating modes assigned to each segment 155 for the example route 140 of FIG. 2. Table 2 shows the assigned operating modes for the segments 155a-155i for two laps around the route 140, shown in Table 2 as "Lap 1" and "Lap 2." As described below, certain segments 155 may have a different assigned operating mode in Lap 1 than in Lap 2. That is, the user may have reasons to select an operating mode other than moving through the segment 155 in the fastest time. For example, the user may want to experience a first lap moving through the segments in the fastest time and may select the operating modes for the first lap accordingly. Then, the user may want to experience one of the turns 170, 175, 180, 185 in one of the segments 155 with a different operating mode that has, e.g., a smaller steering ratio that steers the vehicle 101 through the turn 170, 175, 180, 185 so that the steering angle changes more quickly in the turn 170, 175, 180, 185. Thus, the user may select a different operating mode that has a smaller steering ratio for the segment 155 in the second lap than the operating mode assigned in the first lap.

TABLE 2

| | Segment | | | | | | | | |
|---|---|---|---|---|---|---|---|---|---|
| | 155a | 155b | 155c | 155d | 155e | 155f | 155g | 155h | 155i |
| Turn | Right | Left | Right | Left | Right | Left | Sharp | Straight | Sharp |
| Lap 1 | B | A | B | A | B | A | D | C | D |
| Lap 2 | B | A | C | A | B | A | B | C | D |

The row labeled "Segment" indicates the specific segment 155 on the route 140. The example route 140 of FIG. 2 includes 9 segments 155, labeled 155a-155i. With reference to FIG. 2, the segment 155a starts with the start point 145, i.e., the first segment 160. The segment 155b is the segment 155 immediately following the segment 155a with each successive segment 155 labeled accordingly until the segment 155i, i.e., the last segment 165. The row labeled "Turn" indicates whether the segment 155 includes a left turn 170 ("Left"), a right turn 175 ("Right"), a straightaway 180 ("Straight"), or a sharp turn 185 ("Sharp"). The row labeled "Lap 1" shows the operating mode for each segment 155 as assigned by the user for the first lap around the route 140. The row labeled "Lap 2" shows the operating mode for each segment 155 as determined by the user for the second lap around the route 140. In the example of Table 2, the vehicle 101 may stop after two laps. Alternatively, the user may determine operating modes for more than two laps.

The user may assign an operating mode for each segment 155a-155i, as shown in Table 2. Furthermore, the user may select an operating mode for the segment 155 for each lap, i.e., the operating mode for one of the segments 155 may differ between Lap 1 and Lap 2. For example, Table 2 shows that in Lap 1, the operating modes for each segment 155 correspond to the Modes A, B, C, D for each of the turns 170, 175, 180, 185 that resulted in the lowest times, shown in Table 1. That is, the segments 155 including a left turn 170 are selected to operate in the Mode A, the segments 155 including a right turn 175 are selected to operate in the Mode B, the segment 155 including a straightaway 180 is selected to operate in the Mode C, and the segments 155 including a sharp turn 185 are selected to operate in the Mode D. The computing device 105 may be programmed to assign the operating modes for one of the laps according to the lowest times for each of the turns 170, 175, 180, 185. For example, the computing device 105 may identify the segments 155 that include a sharp turn 185 and assign the Mode D to the segments 155 for one of the laps, and the computing device 105 may identify the segments that include a straightaway 180 and assign the Mode C to the segments 155 for one of the laps. The computing device 105 may allow the user to change the assigned operating mode for the segments 155 in the lap where the computing device 105 has initially assigned the operating mode.

Furthermore, Table 2 shows that the segment 155c is assigned the Mode B in Lap 1 and the Mode C in Lap 2. That is, while the Mode B may result in the shortest time to complete the segment 155c, the user may assign a different operating mode based on, e.g., the settings for the suspension subsystem 107. That is, in the segment 155c, the settings for the suspension subsystem 107 as defined by the Mode B may result in more vibrations from the wheels transmitted to the user (i.e., a bumpier ride) as compared to the settings for the suspension subsystem 107 as defined by the Mode C (i.e., Mode C produces a smoother ride than Mode B).

The user may examine the settings for each of the Modes A, B, C, D (e.g., in a table such as Tables 3A-3B shown below) before assigning the operating modes to the segments 155. Alternatively, the user may operate the vehicle 101 for a plurality of laps around the route 140, assigning one of the Modes A, B, C, D for each segment 155a-155i to experience each of the Modes A, B, C, D in each of the segments 155a-155i, Thus, the user may experience each of the Modes A, B, C, D and develop preferences for each of the Modes A, B, C, D to assign to each segment 155a-155i. If the user prefers settings for the suspension subsystem 107 that result in fewer vibrations transmitted to the user, then the user may select Mode C. Thus, the user can select the operating modes that produce the fastest time around the route 140 on Lap 1 and then select operating modes that result in a different preferred ride on Lap 2.

Further in the present example, the segment 155g is assigned Mode D in Lap 1 and Mode B in Lap 2. Thus, the user may select different operating modes for the same segment 155 on different laps. The computing device 105 may prompt the user to assign the operating modes to the segments 155 when one of the segments 155 lacks an assigned operating mode, e.g., may provide a notification on the HMI 107. Alternatively, the computing device 105 may assign one of the operating modes to the segments 155 where the user has not assigned one of the operating modes, e.g., the operating mode that resulted in the Best Time for a turn 170, 175, 180, 185 in the segment 155.

Tables 3A-3B illustrates the settings for each subsystem 107 for each of the Modes A, B, C, D. Tables 3A-3B lists specific settings for the suspension subsystem 107, the propulsion subsystem 107, and the steering subsystem 107. The settings listed in Tables 3A-3B may be determined according to data 115 collected by the computing device 105 when respective users that define each of the Modes A, B, C, D operate the vehicle 101 around the route 140.

TABLE 3A

| Mode | Suspension Left Front | Suspension Right Front | Suspension Left Rear | Suspension Right Rear | Steering Ratio |
|---|---|---|---|---|---|
| A | 1.1 | 1.3 | 1.2 | 1.3 | 7.5 |
| B | 1.2 | 1.12 | 1.2 | 1.05 | 7.2 |
| C | 1.4 | 1.4 | 1.4 | 1.4 | 7.3 |
| D | 1.3 | 1.3 | 1.3 | 1.3 | 8 |

TABLE 3B

| | Shift Point | Air Flow 1 | Air Flow 2 | Air/Fuel Ratio | Maximum Slip |
|---|---|---|---|---|---|
| A | 6 | 0.99 | 0.99 | 4 | 0.9 |
| B | 6.2 | 0.985 | 0.99 | 4.2 | 0.95 |
| C | 6 | 0.995 | 0.98 | 4.1 | 0.88 |
| D | 6.4 | 0.925 | 0.975 | 4.5 | 0.89 |

For example, Table 3A lists settings for the suspension subsystem 107 in the columns labeled "Suspension," listing the settings for each of a left front wheel, a right front wheel, a left rear wheel, and a right rear wheel of the vehicle 101. The suspension subsystem 107 may include a wheel attached to a spring. As the wheel moves vertically from vertical deviations in the route 140 (e.g., bumps, gravel, etc.) on which the vehicle 101 is travelling, the spring moves vertically, transferring the vertical movement of the wheel to the body of the vehicle 101. The spring may be designed to dampen the vertical movement of the wheel, i.e., the vertical movement of the wheel is greater than the vertical movement of the spring. The values in the "Suspension" columns represent a "motion ratio," which is defined as the ratio of a distance that the wheel moves for a given deviation in the road to a distance that the spring compresses, as is known. For example, Mode A lists a motion ratio of 1.1 for the left front wheel of the vehicle 101, which means that the left front wheel moves 1.1 times as far in the vertical direction as the spring. Thus, because the spring transfers less movement (about 1/1.1 or 9% less) of the left front wheel to the body, the user feels less movement from the vertical deviations in the route 140. Furthermore, Mode C has a motion ratio of 1.4 for the left front wheel, which would further reduce the motion transferred to the body of the vehicle 101. Thus, when the vehicle 101 is operating in Mode C, the user may feel a smoother ride (i.e., less vibration, less vertical movement) than when the vehicle 101 is operating in Mode A.

Table 3A lists a steering ratio for the steering subsystem 107 in the column labeled "Steering Ratio." The steering subsystem 107 may include a steering wheel engaged with a steering rack that turns one of the wheels of the vehicle 101. A "steering ratio," as is known, is a ratio of an angle rotation of the steering wheel and a resulting change of vehicle 101 steering angle. For example, Mode A has a steering ratio of 7.5, which means that when the virtual operator rotates the steering wheel 150 degrees, the steering angle changes 20 degrees. In another example, Mode D has a steering ratio of 8, and when the virtual operator rotates the steering wheel 150 degrees, the steering angle changes 18.75 degrees, i.e., the steering angle changes less relative to a same input on the steering wheel. Thus, Mode A will change the vehicle 101 steering angle more for a given input on the steering wheel than Mode D, allowing the vehicle 101 to turn more quickly with less rotation of the steering wheel, i.e., the steering in Mode A is tighter than the steering in Mode B. The user may prefer tighter steering in certain segments 155 to steer through a turn 170, 175, 180, 185 more quickly or to feel a stronger centrifugal force in the turn 170, 175, 180, 185. The user may select one of the operating modes that has a lower steering ratio than the steering ratio of another of the operating modes, e.g., the user may select Mode A (with a steering ratio of 7.5) instead of Mode D (with a steering ratio of 8).

Table 3B lists a shift point for the suspension subsystem 107 in the column labeled "Shift Point." The suspension subsystem 107 may include a plurality of gears that can be engaged according to a shift schedule, such as is known, e.g., to provide various gear ratios at various vehicle and/or engine speeds. The gears are driven at a rotation speed, typically measured in revolutions per minute (rpm) or kilo-revolutions per minute (krpm), where 1000 rpm=1 krpm. As the rotation speed of one of the gears increases, the transmission subsystem 107 shifts to a different gear that reduces the rotation speed while maintaining the vehicle 101 speed, allowing the vehicle 101 to increase the vehicle 101 speed and maintain the rotation speed of the gears, and hence engine speed, below a threshold RPM level. The shift point, as is known, indicates the threshold of the rotation speed for one of the gears at which the suspension subsystem 107 shifts to a different gear. For example, Mode A has a shift point of 6 krpm (6000 revolutions per minute), indicating that the suspension subsystem 107 shifts to a higher gear when the current gear has a rotation speed of 6 krpm. Mode D has a shift point of 6.2 krpm, indicating that the suspension subsystem 107 in Mode D waits until the current gear rotates to a rotation speed faster than for Mode A, producing a greater acceleration of the vehicle 101 speed than in Mode A.

Table 3B lists a throttle position for two air intakes in the columns labeled "Air Flow 1" and "Air Flow 2." The propulsion subsystem 107 may include two air intakes to introduce air into a combustion chamber. In the example of Table 3B, the column for "Air Flow 1" refers to a first air intake, and the column for "Air Flow 2" refers to a second air intake. The first and second air intakes may be two positions along a single air intake line that are configured to induct air into the air intake line. Each of the first and second intakes may include a throttle to control the amount of air entering the combustion chamber from the respective intake. The value in the columns labeled "Air Flow 1" and "Air Flow 2" indicate a throttle position of the respective air intake, which corresponds to air flow rate through the respective intake. The values range from 0.0, indicating a closed throttle, to 1.0, indicating a completely open throttle (i.e., wide open throttle), wherein higher values indicate more air flow through the respective intake. For example, the column labeled "Air Flow 1" may indicate the throttle position of the first air intake, and the column labeled "Air Flow 2" may indicate the throttle position of the second air intake. Based on the throttle position of one or both of the air intakes, the propulsion subsystem 107 may control the amount of air entering the combustion chamber. For example, Mode A lists the throttle position of both the first and second air intakes at 0.99, while Mode D lists the throttle position of the first air intake at 0.925 and the throttle position of the second air intake at 0.975. Thus, because the throttle positions of the air intakes are more open in Mode A than in Mode D, more air will be introduced to the propulsion subsystem 107 when the vehicle 101 is operating in Mode A than in Mode D.

Table 3B lists an air/fuel ratio for the propulsion subsystem 107 in the column labeled "Air/Fuel Ratio." As is known, the ratio of air to fuel in the combustion chamber of the propulsion subsystem 107 (expressed in Table 3B as mass of air/mass of fuel) controls the combustion within the combustion chamber and the amount of power that can be provided for a given amount of fuel injected into the combustion chamber. Furthermore, the air/fuel ratio can affect the temperature in the combustion chamber, with lower air/fuel ratios resulting in a cooler combustion chamber because the excess fuel absorbs waste heat produced by the combustion. The propulsion subsystem 107 may include a fuel injector programmed, e.g., in an electronic control unit as is known, to inject a mass of fuel based on the predetermined air/fuel ratio, as is known. For example, Mode A has an air/fuel ratio of 4, indicating that the fuel injector is programmed to inject a mass of fuel such that the mass of the air is 4 times the mass of the fuel in the combustion chamber. Mode D has an air/fuel ratio of 4.5, indicating that the fuel injector is programmed to inject a mass of fuel such that the mass of the air is 4.5 times the mass of the fuel. Because the mass of air is typically static and dependent on the geometry of the combustion chamber, the propulsion subsystem 107 thus injects more fuel into the combustion chamber when operating in Mode A than when operating in Mode D, resulting in a cooler combustion chamber.

Table 3B lists a maximum slip ratio for the steering subsystem 107 in the column labeled "Maximum Slip." The steering subsystem 107 may include a front axle connected to two wheels and a rear axle connected to two wheels. The steering subsystem 107 rotates one of the axles (typically the front axle) to steer the vehicle 101. As the axle rotates, the wheels attached to the axle may slip, i.e., release their grip on the roadway and slide along the roadway. Thus, the direction of the forward movement of the vehicle 101 may differ from the direction that the axle faces. The difference between the forward movement of the vehicle 101 and the position of the axle defines an angle known as the "slip angle." The front axle and the rear axle may each have a respective slip angle. To reduce the slip angle, the steering subsystem 107 may adjust the steering ratio until the wheels regain traction with the roadway. The "slip ratio," as is known, is the ratio between the slip angle of the front axle and the slip angle of the rear axle. Thus, the maximum slip ratio indicates the slip ratio below which the steering subsystem 107 adjusts the steering ratio to allow the wheels to regain traction. The maximum slip ratio for Mode A is 0.9, indicating that when the slip angle of the front axle is 90% of the slip angle of the rear axle or lower, the steering subsystem 107 adjusts the steering ratio. The maximum slip ratio for Mode B is 0.95, thus actuating the steering subsystem 107 to adjust the steering ratio when the slip angle of the front axle is 95% of the slip angle of the rear axle or lower. Thus, when the vehicle 101 is operating in Mode B, the steering subsystem 107 will adjust the steering ratio for a smaller slip angle of the front axle.

Figure 3:
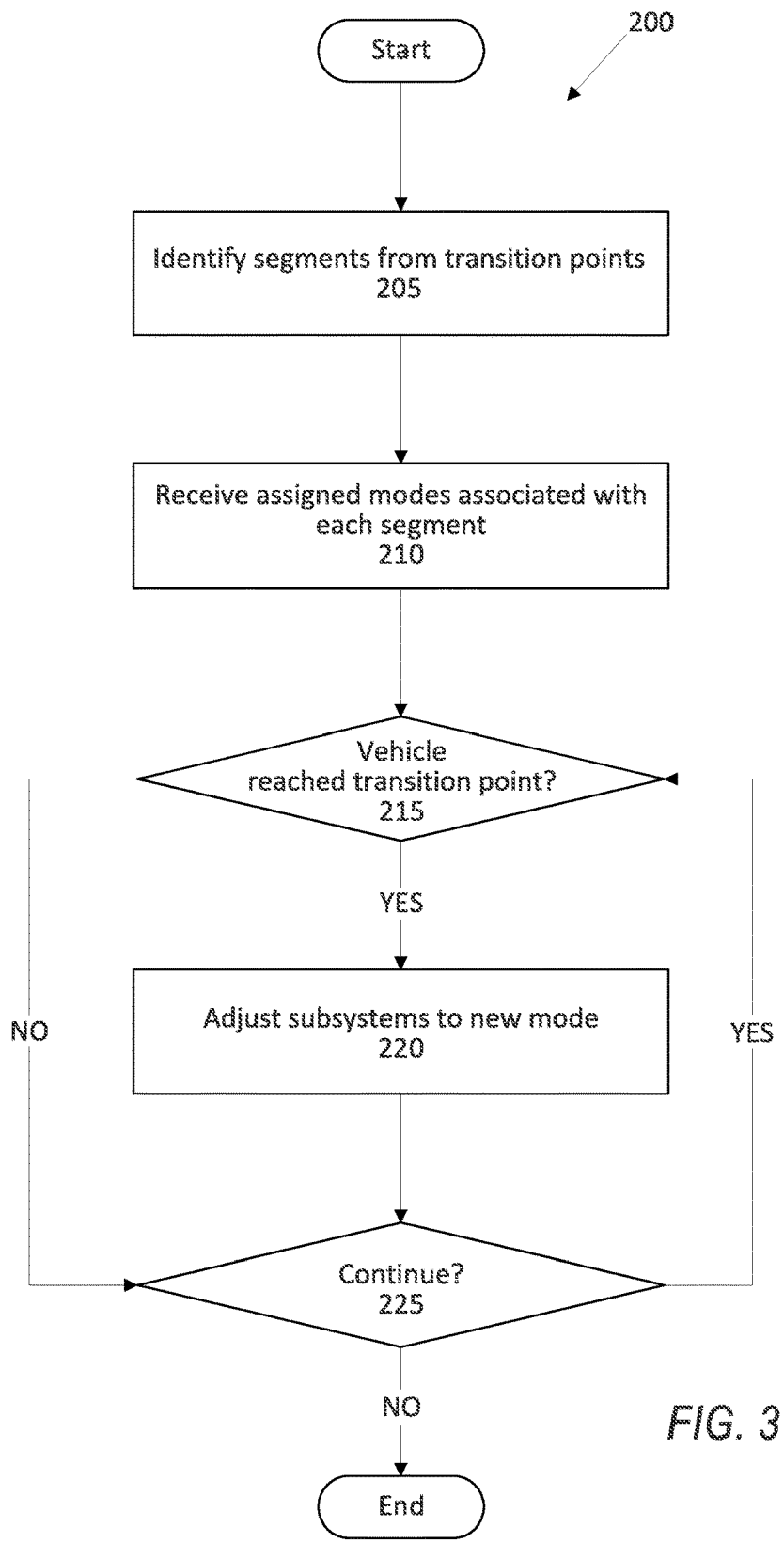
FIG. 3 illustrates an example process for operating a vehicle in one or more operating modes.

FIG. 3 illustrates a process 200 for operating the vehicle 101 along the route 140. The process 200 begins in a block 205, where the computing device 105 identifies the segments 155 of the route 140 based on the transition points 150. As described above, the user may determine the transition points 150 for the route 140 and input the transition points 150 on the HMI 107, and the computing device 105 may identify the segments 155 as the portions of the route 140 between the transition points 150.

Next, in a block 210, the computing device 105 receives an assigned operating mode for each segment 155 from the user, as described above and shown in Table 2. Based on the characteristics of the segment 155, e.g., the turn 170, 175, 180, 185, the user may select one of the operating modes. For example, if the segment 155 includes a sharp turn 185, the user may select the operating mode that includes settings for the steering subsystem 107 to produce a greater steering torque for a steering input from the virtual operator, providing tighter steering around the sharp turn 185. Furthermore, if one of the segments 155 was not assigned an operating mode by the user, the computing device 105 may assign an operating mode to the segment 155. As described above, the user may leave one of the segments 155 without an assigned operating mode, and the computing device 105 may be programmed to assign one of the operating modes to the segment 155. For example, the computing device 105 may determine a turn 170, 175, 180, 185 in the segment 155 and assign an operating mode that resulted in the lowest time for the turn 170, 175, 180, 185, i.e., the operating mode listed as the Best Time in Table 1 above. Alternatively, the computing device 105 may be programmed to assign the operating mode to the segment 155 that matches the operating mode of one of the previous segment 155 and the successive segment 155.

Next, in a block 215, the computing device 105 determines whether the vehicle 101 has reached one of the transition points 150. As the virtual operator operates the vehicle 101 around the route 140, the data collectors 110 collect location data 115 indicating the location of the vehicle 101. The computing device 105 uses the location data 115, e.g., GPS data 115, of the vehicle 101 and compares the location data 115 to the location data 115 defining the transition points 150. If the location of the vehicle 101 is within a predetermined threshold of the transition point 150, the computing device 105 determines that the vehicle 101 has reached the transition point 150. When the vehicle 101 reaches one of the transition points 150, the vehicle 101 enters the next segment 155. If the vehicle 101 has reached one of the transition points 150, the process 200 continues in a block 220. Otherwise, the process continues in a block 225.

In the block 220, the computing device 105 adjusts the vehicle subsystems 107 according to the settings defined by the assigned operating mode of the segment 155. As described above, each of the operating modes includes settings for the vehicle subsystems 107. The virtual operator then operates the vehicle subsystems 107 according to the settings defined in the operating mode. For example, one of the operating modes may include a setting for a suspension subsystem 107 that reduces vibrations generated by a vehicle 101 tire moving along the route 140 to the user.

In the block 225, the computing device 105 determines whether to continue the process 200. For example, the computing device 105 may complete the number of laps requested by the user, indicating that the computing device 105 should end the process 200. In another example, the vehicle 101 may still be in the current lap and approaching the next transition point 150, indicating that the computing device 105 should continue the process 200. If the computing device 105 determines to continue the process 200, the process 200 continues in the block 215. Otherwise, the process 200 ends.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, sensor measurements, computations, processing time, communications time, etc.

Computing devices 105 generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device 105 is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 200, one or more of the steps could be omitted, or the steps could be executed in a different order than shown in FIG. 3. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The invention claimed is:

1. A system, comprising a computer including a processor and a memory, the memory storing instructions executable by the computer to:
    identify a plurality of segments of a predetermined route based on a plurality of transition points;
    adjust a setting of at least one of a plurality of vehicle subsystems according to an assigned operating mode when a vehicle enters one of the segments; and
    actuate the vehicle subsystems according to the assigned operating mode;
    wherein the assigned operating mode is one of a plurality of operating modes, each operating mode including at least one predetermined setting for each one of the vehicle subsystems, the predetermined settings for each operating mode defined according to data collected from operation of the vehicle in the route by a specific user.

2. The system of claim 1, wherein the instructions further include instructions to adjust the setting upon reaching one of the transition points.

3. The system of claim 1, wherein the route includes a start point and wherein the instructions further include instructions to actuate the vehicle subsystems to move the vehicle along the predetermined route for a plurality of laps, each lap starting from the start point and ending upon arriving to the start point and including the assigned operating modes for each of the segments of the route.

4. The system of claim 3, wherein the plurality of laps includes a first lap and a second lap, and wherein the assigned operating mode for at least one of the segments of the route during the second lap is different than the assigned operating mode for the segment of the route for the first lap.

5. The system of claim 1, wherein the vehicle subsystems include at least one of a suspension subsystem, a propulsion subsystem, and a steering subsystem.

6. The system of claim 1, wherein the instructions further include instructions to identify one of the segments that includes a portion having a radius of curvature below a predetermined radius of curvature threshold.

7. The system of claim 6, wherein the instructions further include instructions to assign one of the operating modes to the segment that includes the portion having the radius of curvature below the predetermined radius of curvature threshold.

8. The system of claim 1, wherein the instructions further include instructions to identify one of the segments that includes a portion having a radius of curvature exceeding a predetermined radius of curvature threshold and to assign one of the operating modes to the one of the segments.

9. The system of claim 1, wherein the instructions further include instructions to assign one of the operating modes to one of the segments lacking an assigned operating mode.

10. The system of claim 1, wherein the instructions further include instructions to receive the transition points from a second user.

11. A method, comprising:
    identifying a plurality of segments of a predetermined route based on a plurality of transition points;
    adjusting a setting of at least one of a plurality of vehicle subsystems according to an assigned operating mode when a vehicle enters one of the segments; and
    actuating the vehicle subsystems according to the assigned operating mode;
    wherein the assigned operating mode is one of a plurality of operating modes, each operating mode including at least one predetermined setting for each one of the vehicle subsystems, the predetermined settings for each operating mode defined according to data collected from operation of the vehicle in the route by a specific user.

12. The method of claim 11, further comprising adjusting the setting upon reaching one of the transition points.

13. The method of claim 11, wherein the route includes a start point and wherein the method further comprises actuating the vehicle subsystems to move the vehicle along the predetermined route for a plurality of laps, each lap starting from the start point and ending upon arriving to the start point and including the assigned operating modes for each of the segments of the route.

14. The method of claim 13, wherein the plurality of laps includes a first lap and a second lap, and wherein the assigned operating mode for at least one of the segments of the route during the second lap is different than the assigned operating mode for the segment of the route for the first lap.

15. The method of claim 11, wherein the vehicle subsystems include at least one of a suspension subsystem, a propulsion subsystem, and a steering subsystem.

16. The method of claim 11, further comprising identifying one of the segments that includes a portion having a radius of curvature below a predetermined radius of curvature threshold.

17. The method of claim 16, further comprising assigning one of the operating modes to the segment that includes the portion having the radius of curvature below the predetermined radius of curvature threshold.

18. The method of claim 17, further comprising identifying one of the segments that includes a portion having a radius of curvature exceeding a predetermined radius of curvature threshold and to assign one of the operating modes to the one of the segments.

19. The method of claim 11, further comprising assigning one of the operating modes to one of the segments lacking an assigned operating mode.

20. The method of claim 11, further comprising receiving the transition points from a second user.

* * * * *